United States Patent
Youda (10) Patent No.: US 11,497,998 B2
(45) Date of Patent: Nov. 15, 2022

(54) VIDEO GAME IN WHICH GROUPS OF PLAYERS EARN REWARD BOXES

(71) Applicant: GREE, Inc., Tokyo (JP)

(72) Inventor: Naomichi Youda, Tokyo (JP)

(73) Assignee: GREE, Inc., Tokyo (JP)

( * ) Notice: Subject to any disclaimer, the term of this patent is extended or adjusted under 35 U.S.C. 154(b) by 0 days.

(21) Appl. No.: 17/060,474

(22) Filed: Oct. 1, 2020

(65) Prior Publication Data

US 2021/0016170 A1    Jan. 21, 2021

Related U.S. Application Data

(63) Continuation of application No. 16/232,257, filed on Dec. 26, 2018, now Pat. No. 10,864,439, which is a
(Continued)

(30) Foreign Application Priority Data

Aug. 21, 2013    (JP) .............................. JP2013-171450

(51) Int. Cl.
    *A63F 13/46*    (2014.01)
    *A63F 13/30*    (2014.01)
    (Continued)

(52) U.S. Cl.
    CPC .............. *A63F 13/46* (2014.09); *A63F 13/30* (2014.09); *A63F 13/35* (2014.09); *A63F 13/537* (2014.09); *A63F 13/69* (2014.09); *A63F 13/795* (2014.09)

(58) Field of Classification Search
    CPC .......... A63F 13/69; A63F 13/35; A63F 13/30; A63F 13/46; A63F 13/537
    See application file for complete search history.

(56) References Cited

U.S. PATENT DOCUMENTS 5,522,018 A  *  5/1996  Takeda .................. G06T 15/405
                                                    345/422
2003/0195044 A1*  10/2003  Narita ..................... A63F 13/10
                                                    463/43
(Continued)

FOREIGN PATENT DOCUMENTS

JP    2002-263369 A    9/2002
JP    2004-130119 A    4/2004
(Continued)

OTHER PUBLICATIONS

Examination Report dated Jul. 21, 2020 of corresponding Japanese application No. 2019109880; 10 pages.
(Continued)

*Primary Examiner* — Steve Rowland
(74) *Attorney, Agent, or Firm* — Maier & Maier, PLLC (57) ABSTRACT

A social game capable of adding or improving unexpectedness, dramatic impact, and taste when a reward is provided to a player, and hence capable of raising the player's motivation to participate in or continue the game. A unit for storing information related to a game in which multiple players can participate stores a reward providing condition, rewards, and reward box information, and a control unit for accessing information related to the game, performing computation on the game, and displaying images of the game on terminal devices operated by players allocates at least one reward out of the rewards to the reward box, determines whether the reward providing condition is met based on match-up situations or match-up results between players and first game characters in the game, and displays, on the terminal devices, a screen for providing the reward to players based on the determination results.

18 Claims, 9 Drawing Sheets

Related U.S. Application Data continuation of application No. 15/493,401, filed on Apr. 21, 2017, now Pat. No. 10,201,756, which is a continuation of application No. 14/313,973, filed on Jun. 24, 2014, now Pat. No. 9,662,580.

(51) Int. Cl.
| | | |
|---|---|---|
| *A63F 13/35* | (2014.01) | |
| *A63F 13/537* | (2014.01) | |
| *A63F 13/69* | (2014.01) | |
| *A63F 13/795* | (2014.01) | |

(56) References Cited

U.S. PATENT DOCUMENTS

| | | | | |
|---|---|---|---|---|
| 2004/0143852 | A1* | 7/2004 | Meyers | A63F 13/12 725/133 |
| 2005/0192087 | A1* | 9/2005 | Friedman | G07F 17/32 463/25 |
| 2007/0281775 | A1* | 12/2007 | Kashima | G07F 17/3267 463/20 |
| 2010/0240450 | A1* | 9/2010 | Vargas | G07F 17/32 463/29 |
| 2010/0261520 | A1* | 10/2010 | Lempel | G07F 17/32 463/25 |
| 2011/0312409 | A1* | 12/2011 | Vancura | G07F 17/3281 463/25 |
| 2012/0142429 | A1* | 6/2012 | Muller | A63F 13/35 463/42 |
| 2013/0053152 | A1* | 2/2013 | Tabata | A63F 13/31 463/42 |
| 2013/0131848 | A1* | 5/2013 | Arnone | G07F 17/3244 700/91 |
| 2014/0045589 | A1* | 2/2014 | Paradise | A63F 13/00 463/29 |
| 2014/0335946 | A1* | 11/2014 | Fujisawa | G07F 17/3258 463/27 |

FOREIGN PATENT DOCUMENTS

| | | |
|---|---|---|
| JP | 3520263 B2 | 4/2004 |
| JP | 2009-193217 A | 8/2009 |
| JP | 2010-227459 A | 10/2010 |
| JP | 2013-066524 A | 4/2013 |
| JP | 2013-152686 A | 8/2013 |

OTHER PUBLICATIONS

MJ4 Great Strategies, Sega network Mahjong Battle MJ4, KK Hobby Japan, Dec. 12, 2008, first edition, second printing, pp. 10,16 and105, 8 pgs, including partial Human-generated English-language translation.
"PS Vita "Box!—Open Me-", Launch event" Game Watch [online], Dec. 19, 2012, [search on Jun. 24, 2020], URL:https://game.watch.impress.co.jp/docs/news/579490.html, 9 pgs, including partial Human-generated English-language translation.
Office Action issued in related application JP2013-171450, dated Sep. 20, 2016, with English language translation, 9 pgs.
Office Action issued in related application JP 2013-171450, dated Dec. 20, 2016, with English language translation, 12 pgs.
Office Action issued in related application JP 2013-171450, dated May 23, 2017, with English language translation, 6 pages.
Supercell Exhibit 1003: Microsoft Computer Dictionary, Fourth Edition, p. 115, see "CPU"; p. 176, see "external storage"; p. 290, see "microprocessor"; p. 372, see "RAID" and "RAM", pp. 388 and 389, see "ROM"; 8 pgs. total.
Supercell Exhibit 1004: Memorandum dated Nov. 2, 2016; From: Robert W. Bahr, Deputy Commissioner for Patent Examination Policy; To: Patent Examining Corps; Subject: *Recent Subject Matter Eligibility Decisions Enfish, LLC* v. *Microsolft Corp*, and *TLI Communications LLC* v. *A. V. Automotive, LLC*); 2 pgs.
Supercell Exhibit 1005: Memorandum dated May 19, 2016; From: Robert W. Bahr, Deputy Commissioner for Patent Examination Policy; To: Patent Examining Corps; Subject: Recent Subject Matter Eligibility Decisions; 4 pgs.
Paper: "Petition for Post Grant Review of U.S. Pat. No. 9,662,580", dated Feb. 27, 2018, *Supercell Oy* v. *Gree, Inc.*, filed by Fenwick & West LLP on behalf of Supercell Oy, 71 pgs.
Paper: Patent Owner Preliminary Response dated Jun. 15, 2018, in connection with USPTO, PTAB, *Supercell Oy*, Petitioner, v. *Gree, Inc..*, Patent Owner, Case PGR2018-00036, U.S. Pat. No. 9,662,580, 55 pp.
Paper: Decision Institution of Post-Grant Review, entered Sep. 13, 2018, in connection with USPTO, PTAB, *Supercell Oy*, Petitioner, v. *Gree, Inc.*, Patent Owner, Case PGR2018-00036, U.S. Pat. No. 9,662,580, 14 pages.
Japanese Office Action dated Aug. 21, 2018 of corresponding application No. JP2017-157236; 20 pgs.
Kojiro Nishioka, "Play report of browser RPG "Bravey default playing blades" that you can enjoy Japanese battle command battle and profound character development", 4Gamer.net, [online], Published: Nov. 7, 2012, Searched: Aug. 6, 2018, URL: https://www.4gamer.net/games/190/G019029/20121104001/, Machine Translation attached, 34 pgs.
"About the battle", Bravelydefaultplaingbrage Home Page, [online], Publsihed: Nov. 15, 2012, Searched: Aug. 6, 2018, URL: https://web.archive.org/web/20121115023120/http://bravely.jp/help/battle.html, Machine Translation attached, 8 pgs.
Gree Inc. Exhibit 2001: Declaration of David Crane, in connection with USPTO, PTAB, *Supercell Oy*, Petitioner, v. *Gree, Inc.*, Patent Owner, Case PGR2018-00036, U.S. Pat. No. 9,662,580, 36 pages.
Gree Inc. Exhibit 2002: Curriculum Vitae of David Crane, in connection with USPTO, PTAB, *Supercell Oy*, Petitioner, v. *Gree, Inc.*, Patent Owner, Case PGR2018-00036, U.S. Pat. No. 9,662,580, 6 pages.
Paper: Patent Owner's Response to Petition for Post-Grant Review of U.S. Pat. No. 9,662,580, entered Dec. 13, 2018, in connection with USPTO, PTAB, *Supercell Oy*, Petitioner, v. *Gree, Inc.*, Patent Owner, Case PGR2018-00036, U.S. Pat. No. 9,662,580, 79 pages.
Paper: Petitioner's Reply to Patent Owner's Response, dated Mar. 14, 2019, in connection with USPTO, PTAB, *Supercell Oy*, Petitioner, v. *Gree, Inc.*, Patent Owner, Post Grant Review No. 2018-00036, U.S. Pat. No. 9,662,580, 34 pages.
Exhibit 1012: Tierney, Behind Monty Hall's Doors: Puzzle, Debate and Answer?, New York Times Archives, [URL] nytimes.com/1991/07/21/us/behind-monty-hall-s-doors-puzzle-debate-and-answer.html, Jul. 21, 1991, 5 pages.
Exhibit 1011: Christian Science Monitor, Game show king Monty Hall's 'Let's Make a Deal' most successful television program, Boca Raton News, Apr. 28, 1974, 2 pages.
Exhibit 1010: Rules of Wheel of Fortune, [URL] web.archive.org/web/20100102211300/http://roulettedoc.com/wof-rules.htm, 4 pages.
Exhibit 1009: Deposition of David Crane, dated Feb. 22, 2019, vol. 1, in connection with USPTO, PTAB, *Supercell Oy*, Petitioner, v. *Gree, Inc.*, Patent Owner, Post Grant Review No. 2018-00036, U.S. Pat. No. 9,662,580, 238 pages.
Exhibit 1008: Notices: 2019 Revised Patent Subject Matter Eligibility Guidance, Federal Register, vol. 84, No. 4, Jan. 7, 2019, 8 pages.
Paper: Patent Owner's Objections to Petitioner's Evidence, dated Mar. 21, 2019, in connection with USPTO, PTAB, *Supercell Oy*, Petitioner, v. *Gree, Inc.*, Patent Owner, Post Grant Review No. 2018-00036, U.S. Pat. No. 9,662,580, 6 pages.
Paper: Patent Owner's Sur-Reply, dated Apr. 18, 2019, in connection with USPTO, PTAB, *Supercell Oy*, Petitioner, v. *Gree, Inc.*, Patent Owner, Post Grant Review No. 2018-00036, U.S. Pat. No. 9,662,580, 32 pages.
Office Action dated Mar. 12, 2019 in corresponding Japanese Application No. 2017-157236; 9 pages.
Paper 31: Final Written Decision 35 U.S.C. § 328(a) and 37 C.F.R. § 42.73, dated Sep. 3, 2019, in connection with USPTO, PTAB, *Supercell Oy*, Petitioner, v. *Gree, Inc.*, Patent Owner, Post Grant Review No. 2018-00036, U.S. Pat. No. 9,662,580, 31 pages.

(56) References Cited

OTHER PUBLICATIONS

Paper: Patent Owner's Reply to Petitioner'S Opposition to Motion to Exclude Evidence, dated May 30, 2019, in connection with USPTO, PTAB, *Supercell Oy*, Petitioner, v. *Gree, Inc.*, Patent Owner, Post Grant Review No. 2018-00036, U.S. Pat. No. 9,662,580, 13 pages.

* cited by examiner

VIDEO GAME IN WHICH GROUPS OF PLAYERS EARN REWARD BOXES

CROSS-REFERENCE TO RELATED APPLICATIONS

This application is a continuation of U.S. patent application Ser. No. 16/232,257, filed on Dec. 26, 2018, which is a continuation of U.S. patent application Ser. No. 15/493,401, filed on Apr. 21, 2017, now U.S. Pat. No. 10,201,756, issued on Feb. 12, 2019, which is a continuation of U.S. patent application Ser. No. 14/313,973, filed on Jun. 24, 2014, now U.S. Pat. No. 9,662,580, issued on May 30, 2017, which claims priority to Japanese Patent Application No. 2013-171450, filed on Aug. 21, 2013, the entire contents of which are hereby incorporated by reference.

BACKGROUND

Disclosed herein are a control apparatus, a control method, a computer-readable recording medium, and a game system.

Games provided from a server to mobile terminals operated by players through a communication network have recently achieved popularity, and many game titles have been released using multiple platforms. The kinds and categories of these games cover a lot of ground, and among them, so-called social games that allow multiple players to participate in the same game are in fashion.

Such social games use community-type network services called social networking services (hereinafter called "SNS"). For example, a player (game user) logs in or signs in a platform provided by an SNS provider, and registers for specific games or services in advance as needed so that the player can play various social games prepared there.

As a system (social game system) for playing social games that make effective use of SNS characteristics, there is known, for example, a system for a competition event such as a battle (fighting) where characters (player characters) operated by multiple players attacks one or more enemy characters. In this case, each player becomes a member of a specific group, and if the player defeats the enemy characters, various rewards such as points or items available in the game can be given to each individual player or the group to which these players belong.

SUMMARY

However, in such a conventional social game, points or items available in the game and given when each player defeats the enemy characters are fixed to some extent. Therefore, the player is less likely to have a factor in come-from-behind victory in relation to the other players, and it must be said that the game lacks unexpectedness, dramatic impact, and taste. This might cause a reduction in the player's motivation to participate in the game or continue the game, and hence in the interest in and real enjoyment of the entire game.

Therefore, the invention disclosed herein has been made in view of such a situation, and embodiments of the invention provide a control apparatus, a control method, a computer-readable recording medium, and a game system for providing a social game capable of adding or improving unexpectedness, dramatic impact, and taste when medals, game items, or the like as a reward are provided to a player, and hence capable of raising the player's motivation to participate in the game or continue the game.

In order to solve the above problem, the control method disclosed herein is a control method for a server comprising an information storage unit for storing information related to a game in which multiple players can participate, and a control unit for accessing the information related to the game, performing computation on the game, and displaying images of the game on terminal devices operated by the players to perform the following processing.

First, a reward providing condition, rewards, and reward box information are stored in the information storage unit as part of the information related to the game.

The control unit allocates at least one reward out of the rewards to the reward box, and determines whether the reward providing condition is met based on match-up situations or match-up results between the players and first game characters in the game. Then, the control unit displays, on the terminal devices, a screen for providing the reward allocated to a part and/or the whole of the reward box to the players based on the determination results.

The "player" is a user who operates each terminal device, which is also a concept corresponding to a client in a so-called client-server system. However, this is referred to as the "player" to distinguish it from a user of the server (such as a server administrator). The player can generally participate in the game through a so-called player character taking an active part, acting, and thinking in virtual game space on behalf of the player, and an appropriate game medium associated therewith (hereinafter collectively called a player character). While, the "player" disclosed herein may primarily indicate a player character in a precise sense, or it may be simply referred to as the "player."

The player connects the terminal device to the server configured as such through a communication line so that the player can participate in a game including a predetermined intergroup event online or offline. At this time, the player can create or form a new group in the game at the player's discretion or by any trigger, such as an invitation or introduction from any other player, can belong to an existing group. This allows the player to participate in the intergroup event as a member of the belonging group. The control unit provided in the server accesses the information related to the game stored in the information storage unit, performs various computations on the game using the information, and displays game images as computational results on the terminal device as a game screen so that the game can progress along the game settings.

As the "group," for example, there is a virtual assembly having multiple members as a general term, such as variously elaborated "guild," "party," "team," and "community." Such a "group" may be created or formed in each event held during a certain period of time in the game, or created or formed as a common group or a shared group across multiple game events. Such a "group" may also be created or formed for each game title, or created or formed, for example, for each platform as a common group or a shared group across multiple game titles. A "winner-take-all medal event" taken as a primary intergroup event will be disclosed herein, but in addition to such a type of event, a different kind of event, such as an exchange event among groups held as part of the social game, may also be included.

The "reward" means something that produces the effect of making each player or a group to which the player belongs be in a better position in the progress of the game relative to an opponent player belonging to another group in the intergroup event, or something that enhances the player's value or sense of worth when the player possesses it, and the kind of reward is not particularly limited. For example, the "reward" comprises various items (including the numeric value of a parameter such as points) that increases the player's offensive power, various items such as recovering the physical strength of the player and/or damage to the player, various items that increases damage to an opponent player or a first game character and/or a second game character, and various items that set a value or characteristics to the exhibition of relative merits or magnitude of the damage, or to the rarity itself. The "reward" also comprises medals that can be used to purchase or exchange the various items in the game described above. The description will be made by taking the "medals" as a primary reward.

The computer-readable recording medium disclosed herein is to record processes for causing a computer to perform the following processing, where the computer is accessible to an information storage unit for storing information related to a game in which multiple players can participate, and storing a reward providing condition, rewards, and reward box information as part of the information related to the game.

In other words, the computer is caused to perform: accessing the information related to the game, performing computation on the game, and displaying images of the game on terminal devices operated by the players; allocating at least one reward out of the rewards to the reward box, and determining whether the reward providing condition is met based on match-up situations or match-up results between the players and first game characters in the game; and displaying, on the terminal devices, a screen for providing the reward allocated to a part and/or the whole of the reward box to the players based on the determination results.

The control apparatus disclosed herein comprises: an information storage unit for storing information related to a game in which multiple players can participate; and a control unit for accessing the information related to the game, performing computation on the game, and displaying images of the game on terminal devices operated by the players.

The information storage unit holds a reward providing condition, rewards, and reward box information as part of the information related to the game.

The control unit allocates at least one reward out of the rewards to the reward box, determines whether the reward providing condition is met based on match-up situations or match-up results between the players and first game characters in the game, and displays, on the terminal devices, a screen for providing the reward allocated to a part and/or the whole of the reward box to the players based on the determination results.

The game system disclosed herein comprises: a control apparatus including an information storage unit for storing information related to a game in which multiple players can participate, and a control unit for accessing the information related to the game, performing computation on the game, and displaying images of the game on terminal devices operated by the players; and the terminal devices.

Like in the control apparatus disclosed herein, the information storage unit holds a reward providing condition, rewards, and reward box information as part of the information related to the game.

Further, the control unit allocates at least one reward out of the rewards to the reward box, determines whether the reward providing condition is met based on match-up situations or match-up results between the players and first game characters in the game, and displays, on the terminal devices, a screen for providing the reward allocated to a part and/or the whole of the reward box to the players based on the determination results.

According to embodiments of the invention, unexpectedness, dramatic impact, and taste can be added or improved when game items or the like as a reward are provided to a player, and hence a control apparatus, a control method, a computer-readable recording medium, and a game system for providing a social game capable of raising the player's motivation to participate in the game or continue the game can be realized.

DETAILED DESCRIPTION

A first embodiment of the invention will be described in detail below. Note that the embodiment below is intended only to be by way of example to describe the invention, and the invention is not limited to the embodiment alone. Various modifications are possible as long as the gist of the invention is not changed. Further, those skilled in the art can adopt any other embodiment in which each component or element to be described below is replaced with an equivalent one, and such an embodiment is included in the scope of the invention. Positional relations, such as left, right, top, and bottom, indicated as needed are based on those shown in the drawings unless otherwise noted. Note further that various dimension ratios in the drawings are not limited to the dimension ratios shown. In order to facilitate the understanding, the following description will take, as an example, one embodiment in which the invention is carried out by using a game information processing apparatus, but as mentioned above, the invention is not limited thereto.

Figure 1:
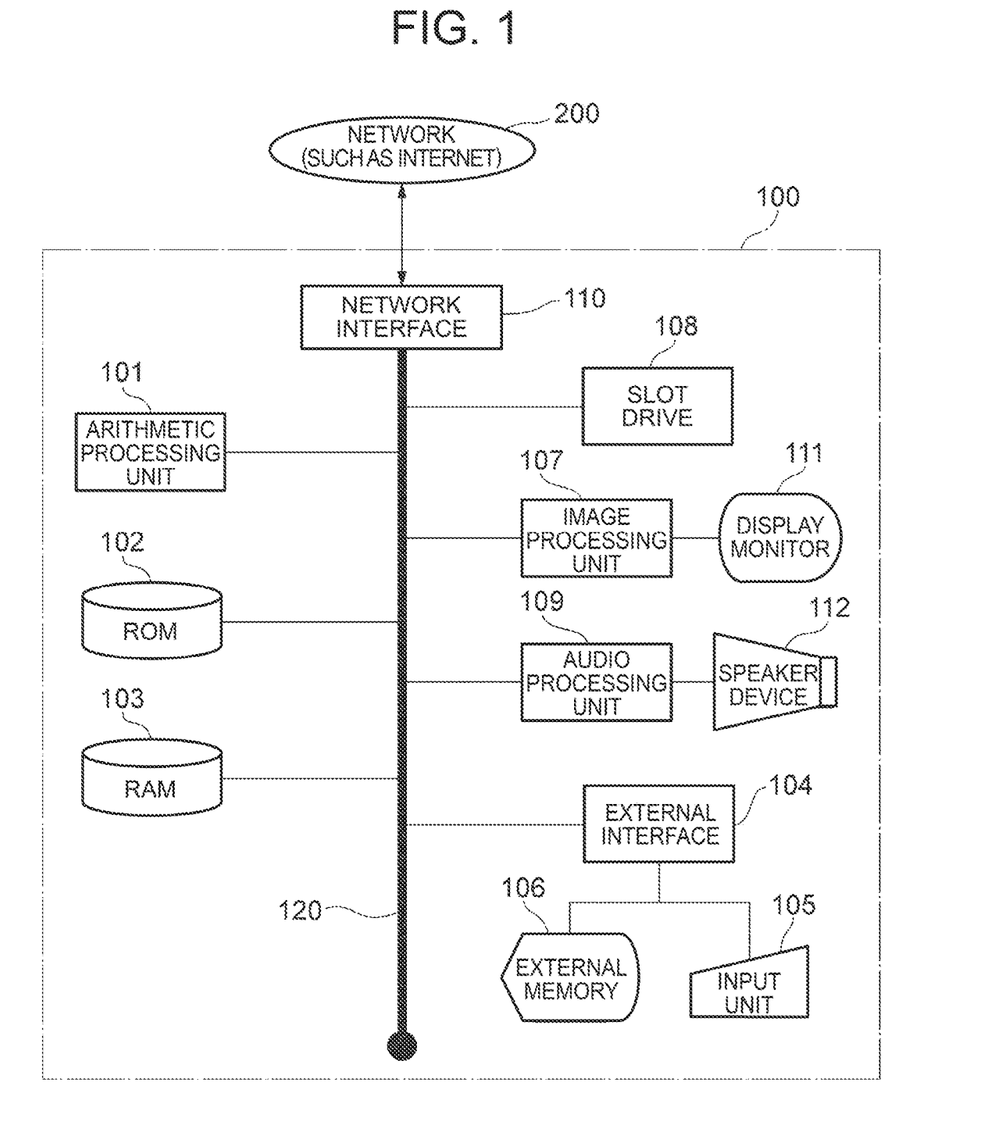
FIG. 1 is a schematic block diagram (system block diagram) showing one preferred embodiment of a server in a first embodiment of the invention.
Figure 2:
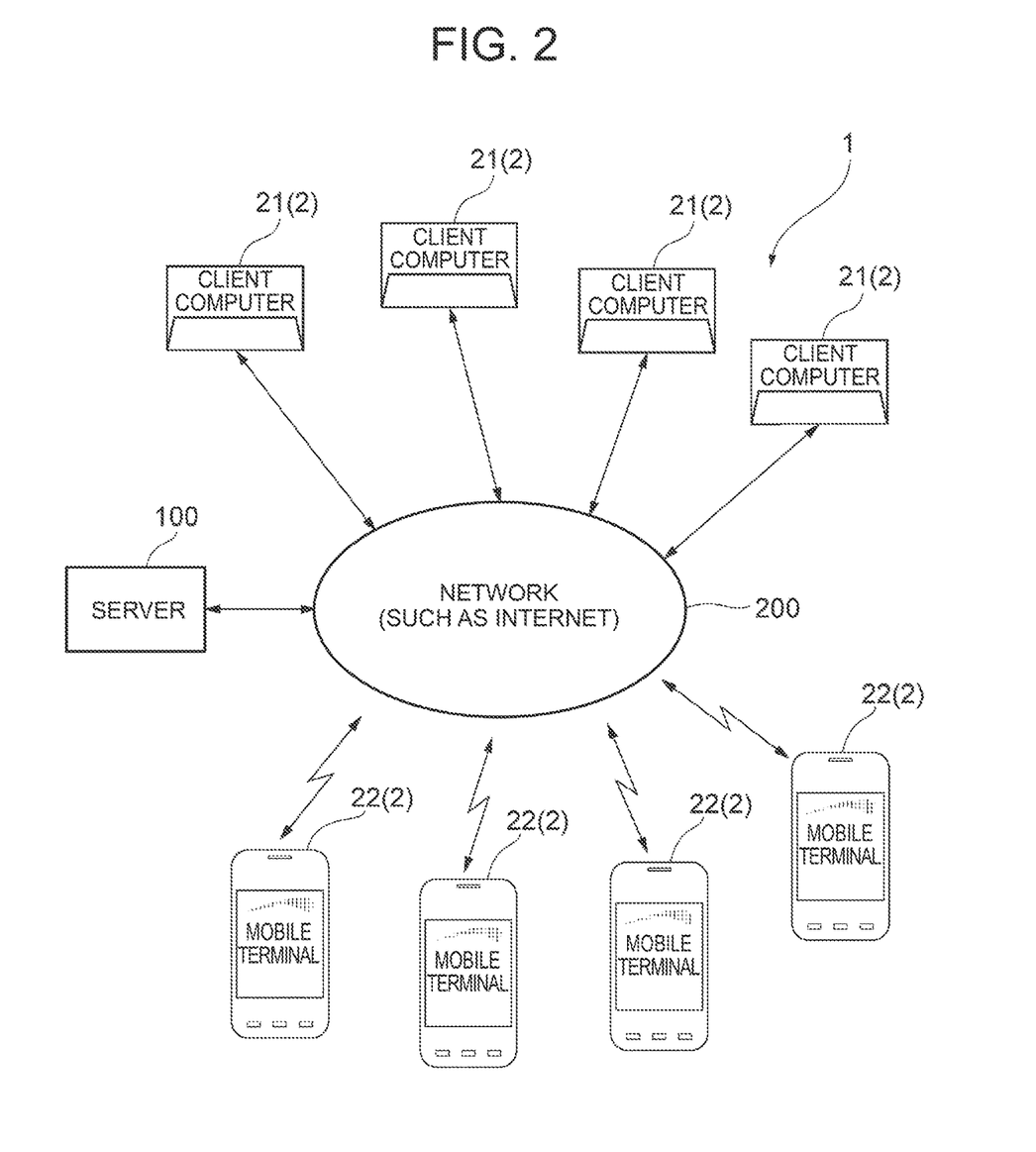
FIG. 2 is a schematic block diagram (system configuration diagram) showing one preferred embodiment of a game system in the first embodiment.

FIG. 1 is a schematic block diagram (system block diagram) showing one preferred embodiment of a server disclosed herein. FIG. 2 is a schematic block diagram (system configuration diagram) showing one preferred embodiment of a game system disclosed herein. As shown in these figures, a server 100 is a server computer connected to a network 200, and a predetermined server program is run on the server computer to fulfill a server function. Further, the server 100 and terminal devices 2 such as client computers 21 and mobile terminals 22, connected by wire and/or wireless to the network 200, are set up to be communicable with one another to configure a game system 1.

The network 200 is a communication line or a communication network relating to information processing such as the Internet, and a specific structure thereof is not particularly limited as long as the network 200 enables the exchange of data between the server 100 and the terminal devices 2. For example, the network 200 may comprise a base station wirelessly connected to the terminal devices 2, a mobile communication network connected to the base station, the Internet connected to the server, and a gateway device for connecting the mobile communication network and the Internet.

The server 100 is configured to comprise an arithmetic processing unit 101 such as a CPU or an MPU, a ROM 102 and a RAM 103 as storage devices, an external interface 104 to which an input unit 105 and an external memory 106 are connected, and an image processing unit 107 to which a display monitor 111 is connected. The server 100 is also configured such that a slot drive 108 into or to which a disk or a memory device is loaded or connected, an audio processing unit 109 to which a speaker device 112 is connected, and a network interface 110 are connected to one another through a transmission path 120 such as a system bus, including, for example, an internal bus, an external bus, and an expansion bus. Note that devices responsible for input/output of the input unit 105, the external memory 106, the display monitor 111, and the speaker device 112 may be omitted appropriately as needed, or even when these devices are included, they may not always be connected to the transmission path 120.

The arithmetic processing unit 101 controls the entire operation of the server 100 not only to exchange control signals and information signals (data) with the other components mentioned above, but also to perform various arithmetic processing necessary to execute a game. Therefore, the arithmetic processing unit 101 is configured to be able to perform, on a fast-accessible storage area such as a so-called register, arithmetic operations such as addition, subtraction, multiplication and division using an arithmetic logical unit or the like, logical operations such as logical OR, logical AND, and logical NOT, bitwise operations such as bitwise OR, bitwise AND, bitwise invert, bitwise shift, and bitwise rotate, and if desired, a saturation calculation, a trigonometric function calculation, a vector operation, and the like.

An IPL (Initial Program Loader) first executed after power-on is generally recorded in the ROM 102. This IPL is executed so that the arithmetic processing unit 101 will read a server program and a game program once into the RAM 103 to execute the programs, where the programs are recorded on a disk or in a memory device loaded in or connected to the slot drive 108. An operating system program necessary to control the entire operation of the server 100 and other various data are also recorded in the ROM 102.

The RAM 103 is to store the server program, the game program, and various data temporarily. In addition to the server program and game program read as mentioned above, data necessary to the progress of the game and communication between two or more terminal devices 2 are held in the RAM 103. The arithmetic processing unit 101 sets a variable area in the RAM 103 to perform direct operations using the arithmetic logical unit on values stored in the variable area as well. Further, the arithmetic processing unit 101 once copies or moves the values stored in the RAM 103 to the register to perform direct operations on the register and further perform processing for writing these operation results back to the RAM 103.

The input unit 105 connected through the external interface 104 is to accept various operations input by a user (game provider) of the server 100. As the input unit 105, a voice input unit can be employed as well as a keyboard, a touch pad, and a touch panel. The kind of device as the input unit 105 is not particularly limited as long as the device can input instructions, such as various operations, a confirmation operation, a cancel operation, and the display of a menu.

Rewritably stored in the RAM 103 and the external memory 106, removably connected through the external interface 104, are data indicative of the operating conditions of the server 100, the access status of each terminal device 2, and the game playing conditions and the status of progress (the results in the past, and the like) on each terminal device 2, log (record) data on communication between terminal devices 2, and the like.

The image processing unit 107 has the arithmetic processing unit 101 process the various data read from the slot drive 108 or processes the various data by itself, and records processed image information in a frame memory or the like. The image information recorded in this frame memory is converted to a video signal at predetermined synchronization timing, and output to the display monitor 111 connected to the image processing unit 107. This enables various images to be displayed. Further, in cooperation with the arithmetic processing unit 101, image information on a game is sent from the image processing unit 107 and/or the arithmetic processing unit 101 to each terminal device 2.

The audio processing unit 109 converts the various data read from the slot drive 108 into audio signals, and outputs the audio signals from the speaker device 112 connected to the audio processing unit 109. Further, in cooperation with the arithmetic processing unit 101, audio information on the game (sound effects and music information) is sent from the audio processing unit 109 and/or the arithmetic processing unit 101 to each terminal device 2.

The network interface 110 is to connect the server 100 to the network 200. The network interface 110 is configured to comprise, for example, an analog modem, an ISDN modem, or an ADSL modem, which conforms to each standard used in establishing a LAN, a cable modem for connection to the Internet using a cable TV line, and the like, and an interface for connecting these to the arithmetic processing unit 101 through the transmission path 120.

One preferred embodiment of a game (social game) implemented in the game system 1 configured as such and the server 100 according to a game program of the invention disclosed herein will be described below.

Figure 3:
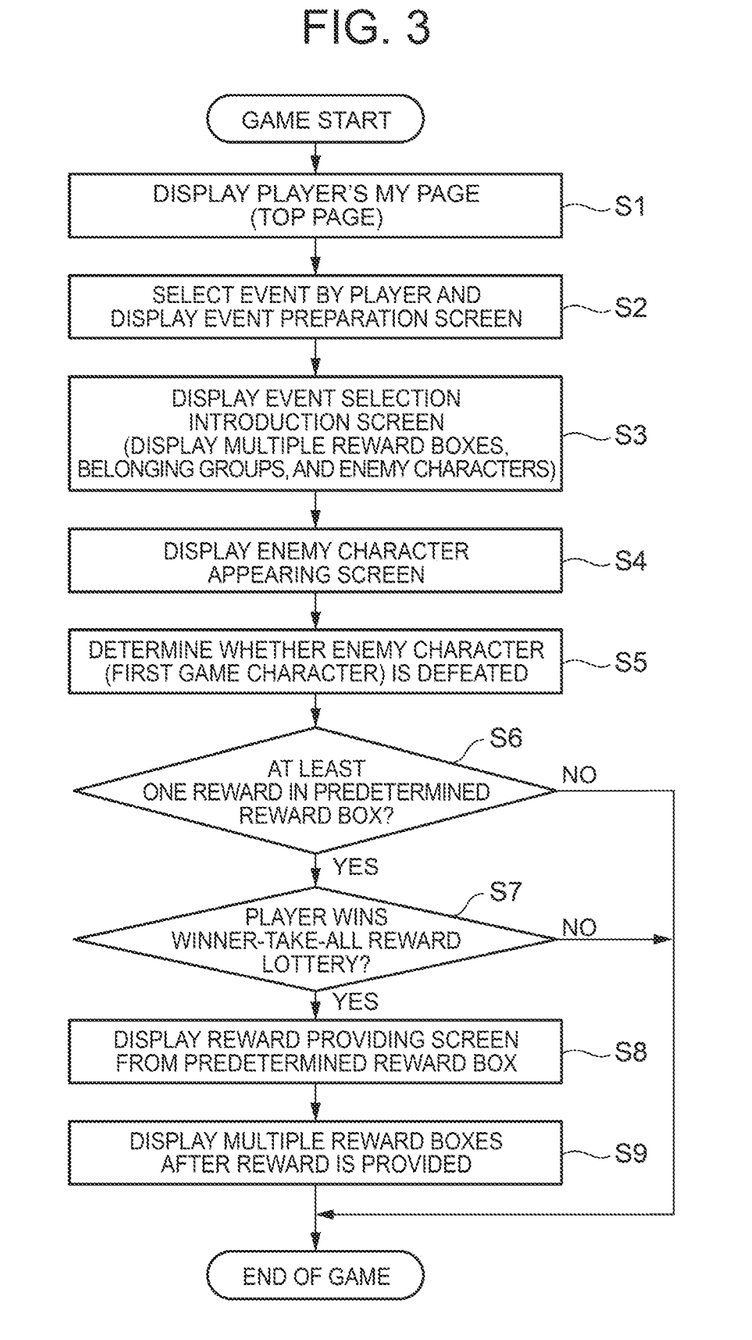
FIG. 3 is a flowchart showing part of a game procedure performed on the server in the first embodiment.

FIG. 3 is a flowchart showing part of a game procedure performed on the server in the first embodiment of the invention, particularly showing a flow focused on the evolution of a game screen to be displayed on a terminal device 2 operated by a player.

Note that various processing (image or screen display, determination, calculation, and the like) in the procedure mentioned below is performed based on control instructions from the arithmetic processing unit 101 of the server 100. In other words, the arithmetic processing unit 101 functions as a "control unit" in the present invention. Further, various storage media with game information recorded thereon in addition to the ROM 102, the RAM 103, and the external memory 106 mentioned above correspond to an "information storage unit" in the invention.

Here, when a player starts a game, the player first operates a terminal device 2 (a client computer 21 or a mobile terminal 22, or a tablet terminal or a smartphone) to connect the terminal device 2 to the server 100 through the network 200 such as the Internet. The player further operates the terminal device 2 to select a game provided from the server 100 or enter login information such as an ID number or a personal identification number on a platform screen before the selection of the game. When recognizing the login information, the arithmetic processing unit 101 of the server 100 displays, on the terminal device 2, my page unique to the player associated with the ID number (step S1 shown in FIG. 3).

Figure 4:
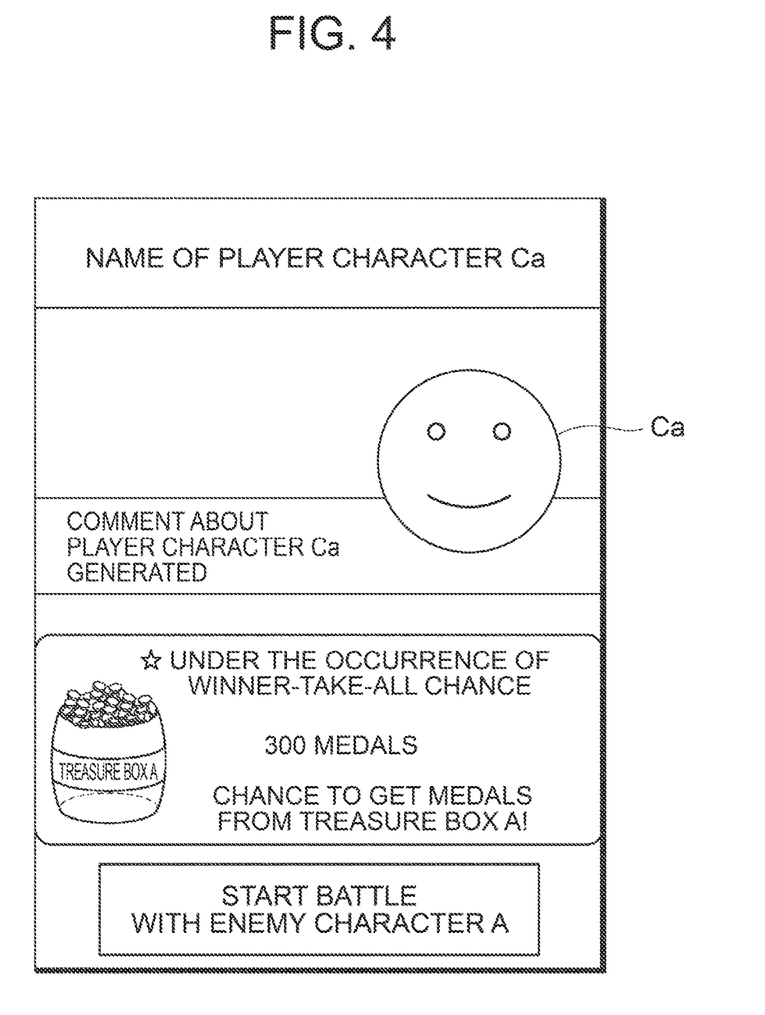
FIG. 4 is a schematic view showing a configuration example of a game screen in the first embodiment.

Next, when the player selects a desired event from a list of at least one event displayed on the terminal device 2, a preparation screen for the event is displayed on the terminal device 2 as shown in FIG. 4 (step S2 shown in FIG. 3).

Note that the player can voluntarily select the event from the list of at least one event as mentioned above, or the player can automatically participate in a current ongoing event after logging in. Thus, there is no particular limitation on whether the participation of the player in the event is active or passive.

The name of a player character Ca is displayed at the top of FIG. 4. A facial image and a comment about the player character Ca are displayed in the middle of FIG. 4. For example, a comment to urge the player to participate in the event is displayed. Further, an image indicating what kind of event is taking place is displayed in a lower part of FIG. 4. For example, as shown in the lower part of FIG. 4, the player knows that a winner-take-all reward event is taking place, and that 300 medals are potentially acquired as the reward the winner can take all. A button image for confirming the participation in the event is also displayed. When selecting this button on the screen, the player can participate in the event.

Figure 5:
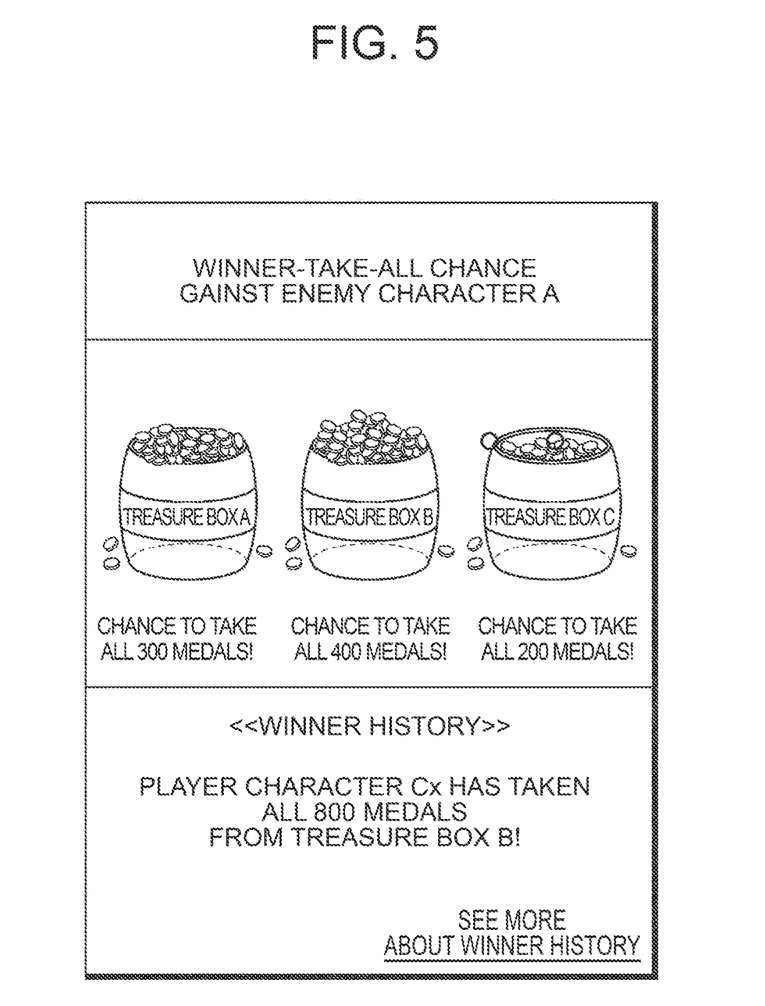
FIG. 5 is a schematic view showing another configuration example of a game screen in the first embodiment.

Upon completion of the preparation for the selected event in the arithmetic processing unit 101 shown in FIG. 1, an introduction screen for the event is displayed on the terminal device 2 as shown in FIG. 5 (step S3 shown in FIG. 3).

As the event introduction screen displayed on the terminal device 2, for example, a string of characters such as "Winner-take-all chance against enemy character A" is displayed on the terminal device 2 as shown at the top of FIG. 5 to let the player know that the reward can be acquired by defeating enemy character A. Treasure boxes B and C other than treasure box A corresponding to group A to which the player belongs are also displayed in the middle of FIG. 5. A display that lets the player belonging to a group A know its own belonging group can also be provided. For example, treasure box A may be more brightened or displayed larger than the other treasure boxes B and C, or a character string may be attached near the image of treasure box A. Further, the name of any player character that has acquired a reward in a past event and acquired reward (medals and/or various items other than the medals) are displayed as shown at the bottom of FIG. 5. The winner history may be displayed using a pop-up or a flash in addition to characters or an image.

Figure 6:
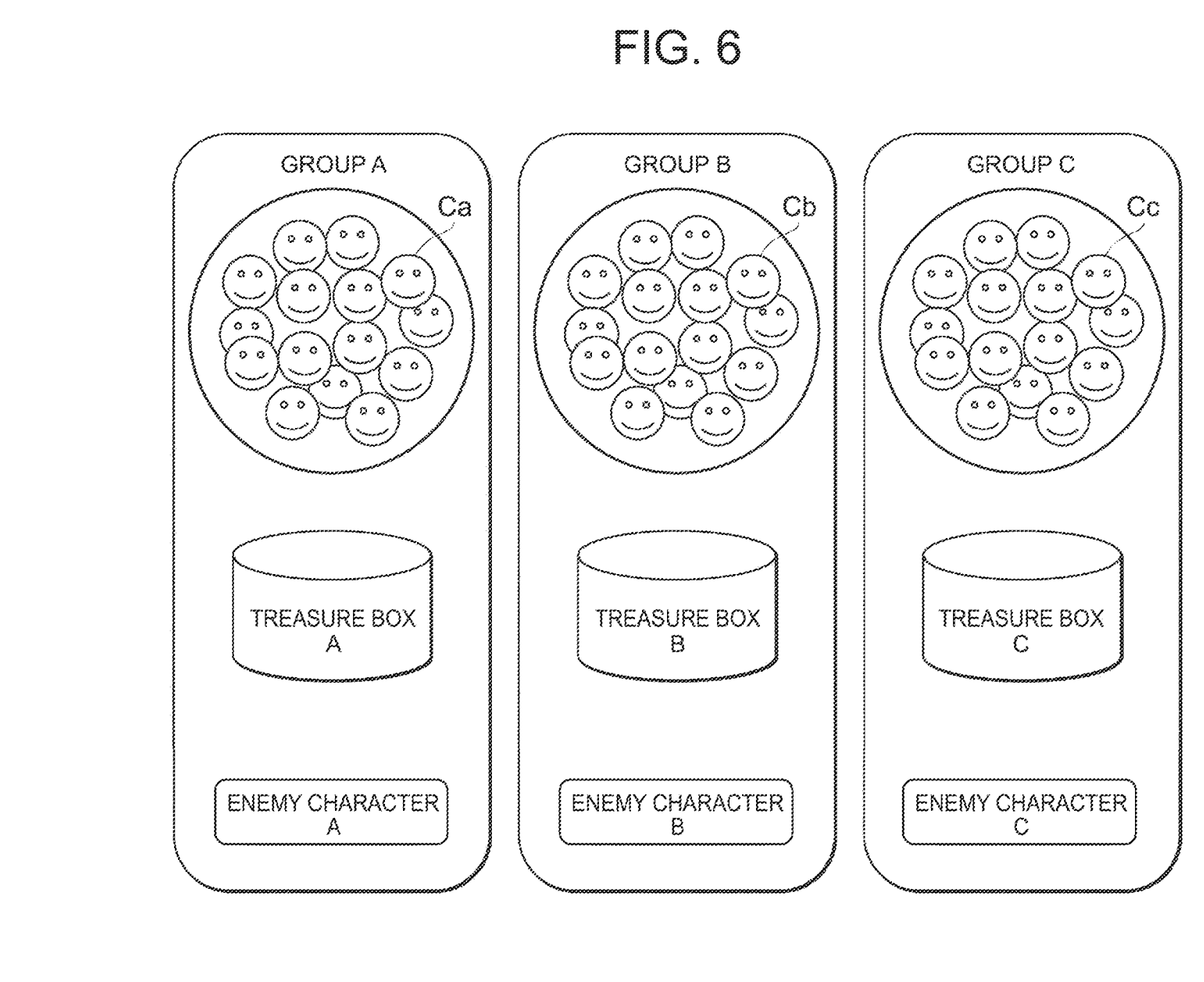
FIG. 6 is a conceptual diagram of grouping of groups, treasure boxes, and enemy characters in the first embodiment.

FIG. 6 shows a conceptual diagram of grouping of groups, treasure boxes, and enemy characters. As shown in FIG. 6, a group A to which at least one player character belongs, a treasure box A, and an enemy character A are associated with one another. Like the group A, groups B and C are also associated with respective treasure boxes and enemy characters as shown in FIG. 6. As will be described in detail later, when a player (player character Ca) belonging to the group A defeats the enemy character A associated with the group A, the player can acquire a reward stored in the treasure box A.

There are more ways of association than the association among the group, the treasure box, and the enemy character mentioned above. For example, two or more groups may be associated with one kind of enemy character or one enemy character, or two or more groups may be associated with one treasure box, or a single group may be associated with at least one treasure box and enemy character.

Upon completion of the introduction of the event, a screen on which an enemy character associated with the event appears is displayed on the terminal device 2 (step S4 shown in FIG. 3). This game is so configured that the enemy character and a player or a player character fight a battle with each other, and when the player or the player character wins the battle, the player can acquire a reward.

Therefore, after the enemy character is displayed, the player makes an attack on the enemy character or defends against an attack from the enemy character in the game. The player further uses various items (such as a summon card and a performance boosting card) that exhibit various other effects, or uses a player character such as an ally monster that makes an attack face to face with the enemy character to fight with the enemy character. A game screen of the fighting state may also be displayed on the terminal device 2.

Next, the arithmetic processing unit 101 shown in FIG. 1 determines whether the player or the player characters has defeated the enemy character (e.g., a boss character that is the last to appear) (a determination condition associated with a predetermined event) (step 5 shown in FIG. 3). The determination method is not particularly limited. For example, a numerical comparison operation can be performed to compare the numerical values of parameters, i.e., it can be determined that the enemy character has been defeated when the numeric value of a parameter corresponding to the physical strength (such as a hit point or life) of the enemy character becomes less than a predetermined threshold value or zero as a result of receiving an attack from the player or the player character.

Figure 7:
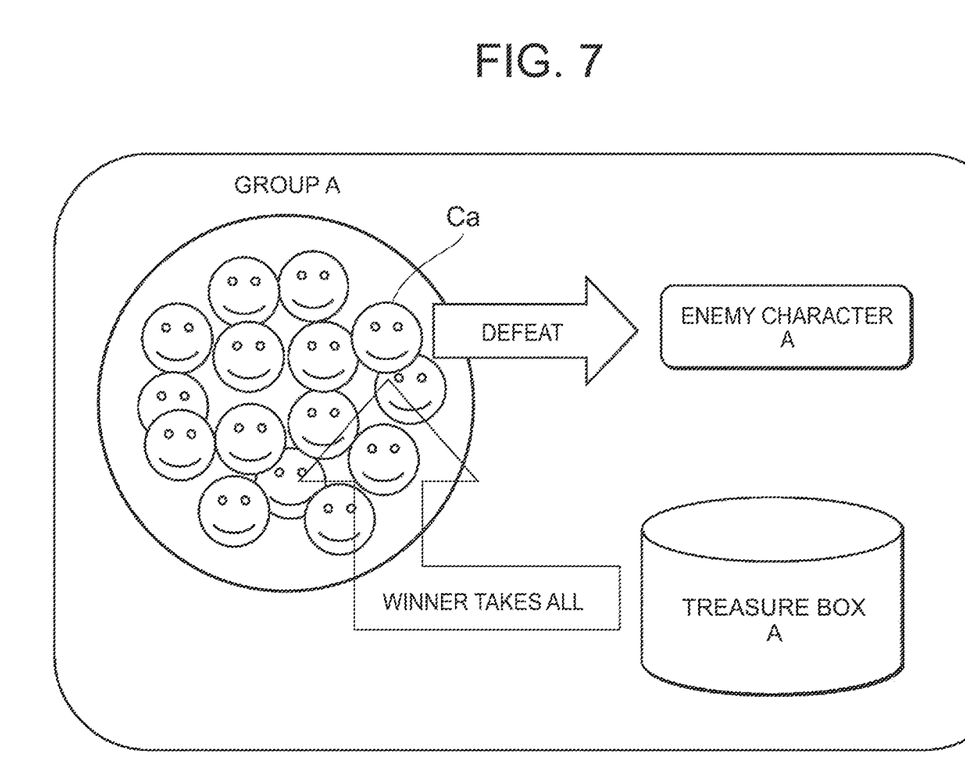
FIG. 7 is a conceptual diagram showing a flow of providing a reward in the first embodiment.

FIG. 7 is a conceptual diagram showing a flow of providing a reward. As shown in FIG. 7, the player (player character Ca) belonging to the group A can acquire the whole reward (take all) stored in the treasure box A by defeating the enemy character A. A flow of providing a reward to a player after an enemy character is defeated will be described in detail below by taking a case where the player belonging to the group A has defeated the enemy character A.

First, medals as a reward are allocated to each of the treasure boxes A, B, and C, respectively. In addition to the medals, prize items (such as player character's cards and various items available in the game) may also be allocated.

In this case, the medals allocated to the treasure box A and the medals allocated to the treasure boxes B and C may be set as reward groups (medal groups) different from each other. Further, the respective medal groups may be so set that the rarity of medals allocated to the treasure box A will be higher than the rarity of medals allocated to the treasure boxes B and C.

Specifically, the arithmetic processing unit 101 of the server 100 shown in FIG. 1 allocates medals to respective treasure boxes based, for example, on at least any one of the following predetermined conditions: the game elapsed time, the number of enemy characters defeated by the player, the progress of the game (such as the number of events, dungeons, or quests completed), the kind of a predetermined event (such as the level of a selected event or the number of times of the event), the kind of treasure box, the state of the player character (such as physical strength, experience point, and the number of possessed items), and items possessed by the player character (such as the ability of each item and the number of items).

Then, the arithmetic processing unit 101 shown in FIG. 1 determines whether there is at least one medal in the treasure box A (step 6 shown in FIG. 3). When there is any medal, the procedure proceeds to step 7 shown in FIG. 3, while when there is no medal, the player can acquire no medal, and hence the game is eventually ended. The determination as to whether to proceed to step 7 shown in FIG. 3 may be made based on criteria to determine the game elapsed time or whether a predetermined number of medals or more are allocated to the treasure box A.

Next, the arithmetic processing unit 101 shown in FIG. 1 determines the probability of providing the medals allocated to the treasure box A to the player (player character Ca) unconditionally or based on a predetermined condition prior to or when providing the medals to the player (player character Ca) defeating the enemy character A and belonging to the group A.

Specifically, the arithmetic processing unit 101 of the server 100 shown in FIG. 1 determines the probability of providing the medals based, for example, on at least any one of the following predetermined conditions: the number of enemy characters defeated by the player (player character Ca), the state of the enemy character defeated by the player (player character Ca), and the state of the player (player character Ca) when a given number of medals are allocated to the treasure box A.

Then, the arithmetic processing unit 101 shown in FIG. 1 determines whether the player (player character Ca) wins a winner-take-all medal lottery (step 7 shown in FIG. 3). When the player (player character Ca) wins, all the medals (300 medals as disclosed herein) allocated to the treasure box A are provided to the player (player character Ca), while when the player (player character Ca) does not win, the player (player character Ca) can acquire no medal, and hence the game is eventually ended. Note that the way to provide the reward may be to provide all the medals allocated to the treasure box A or to provide a large number of medals to such an extent that the player can win a come-from-behind victory in relation to the other players, rather than all the medals allocated to the treasure box A.

Figure 8:
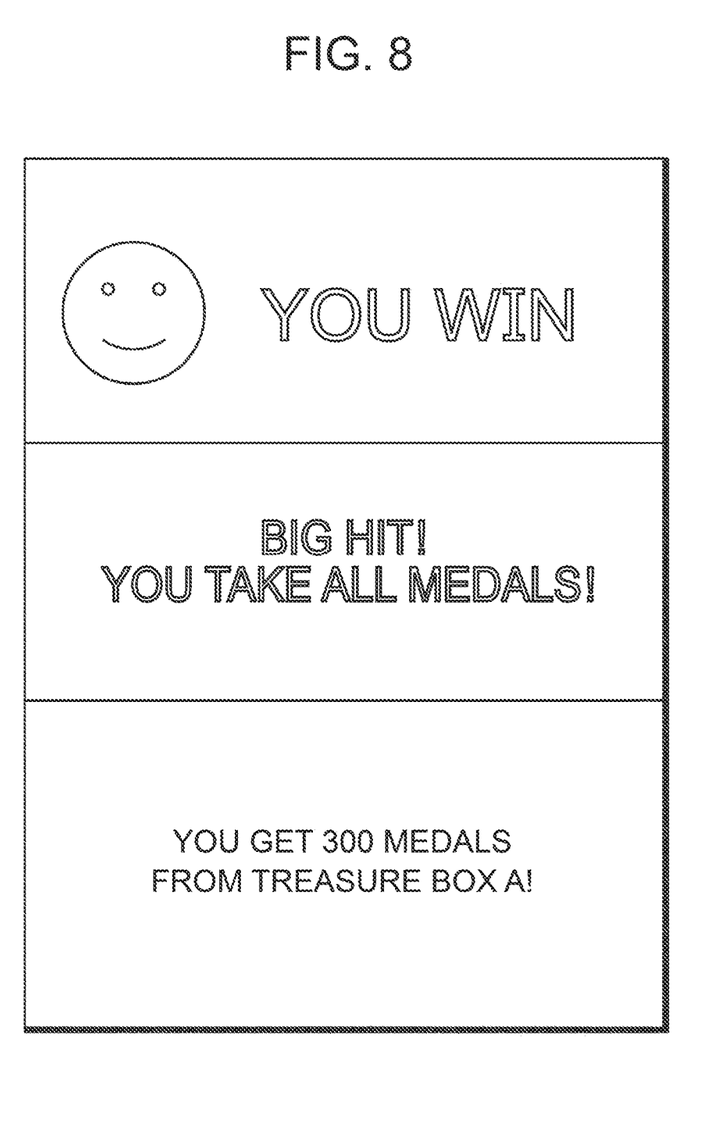
FIG. 8 is a schematic view showing still another configuration example of a game screen in the first embodiment.

Next, when the player (player character Ca) wins the winner-take-all medal lottery and hence all the medals allocated to the treasure box A (300 medals as disclosed herein) are provided to the player (player character Ca), the arithmetic processing unit 101 shown in FIG. 1 displays, on the terminal device 2, a medal from the treasure box A providing screen is displayed as shown in FIG. 8 (step 8 shown in FIG. 3).

Figure 9:
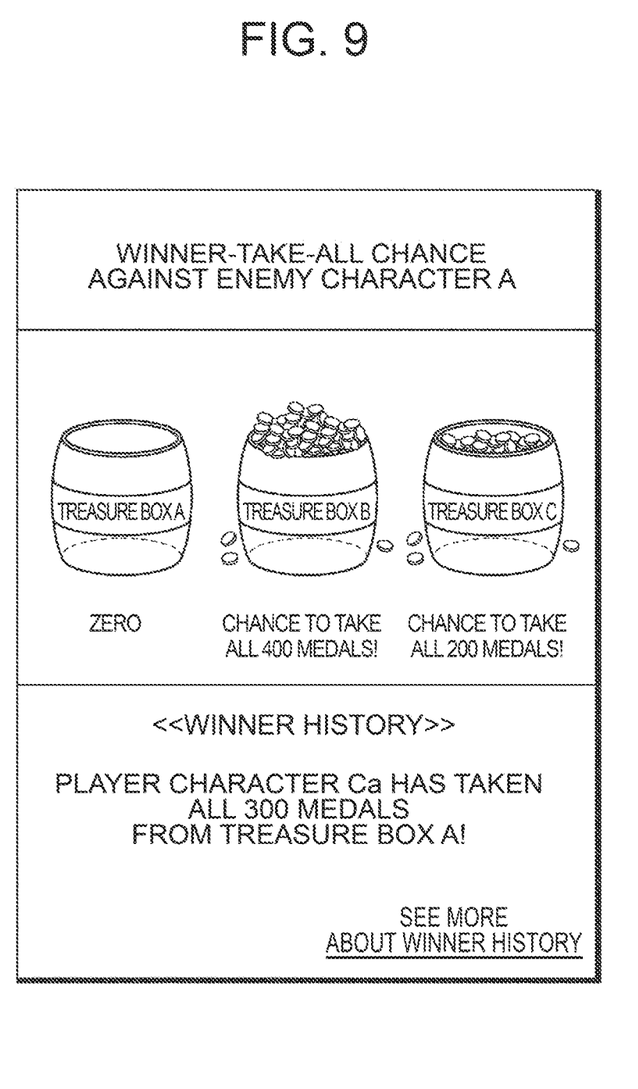
FIG. 9 is a schematic view showing yet another configuration example of a game screen in the first embodiment.

Further, when all the medals allocated to the treasure box A (300 medals as disclosed herein) are provided to the player (player character Ca), the arithmetic processing unit 101 shown in FIG. 1 displays, on the terminal device 2, images including the other treasure boxes (treasure boxes B and C) after the medals are provided from the treasure box A as shown in FIG. 9 (step 9 shown in FIG. 3). Specifically, the word "zero" is attached below the image of the treasure box A as shown in the middle of FIG. 9. Then, the treasure boxes B and C are displayed to indicate that the medals remain in the treasure boxes B and C, and the "winner-take-all chance" event still continues.

The winner history is displayed together at the bottom of FIG. 9. For example, when the player (player character Ca) won a prize and has just acquired the medals as shown at the bottom of FIG. 9, a display is provided to let players know that the player (player character Ca) has acquired all the medals allocated to the treasure box A. Note that the winner history is not limited to the display of the most recent winner information alone, and the history of past winners may also be displayed. Specifically, the names of any player characters that acquired rewards in the past events and the acquired rewards (such as medals and/or various items other than the medals) are displayed. Further, the winner history may be displayed using a pop-up or a flash in addition to texts or an image.

Thus, according to the embodiment, unexpectedness, dramatic impact, and taste can be added or improved when medals or game items as a reward are provided to a player as mentioned above, and this can lead to providing a social game capable of raising the player's motivation to participate in the game or continue the game.

OTHER EMBODIMENTS

As mentioned above, the invention disclosed herein is not limited to the aforementioned embodiment and the variations already mentioned, and various modifications are possible without departing from the scope of the invention. For example, the disclosure shows that the player (player character Ca) belonging to the group A can acquire the whole reward (take all) stored in the treasure box A by defeating the enemy character A, but a player (player character Cb) belonging to the group B as shown in FIG. 6 may be able to acquire the whole reward (take all) stored in the treasure box B by defeating an enemy character B. Further, a player (player character Cc) belonging to the group C may be able to acquire the whole reward (take all) stored in the treasure box C by defeating an enemy character C.

The configuration of the server 100 shown in FIG. 1 is also adapted to the client computer 21 and the mobile terminal 22 as terminal devices 2 despite some differences in throughput and the like. In other words, the client computer 21 and the mobile terminal 22 can be used as servers 100, i.e., any of computers connected through the network 200 can function as a server.

Further, in the server 100, mass-storage devices such as a hard disk and an SSD may be used to perform functions equivalent to those of the ROM 102, the RAM 103, the external memory 106, and the memory device loaded into the slot drive 108. These storage devices may not be made redundant by a RAID, or may not be connected to the arithmetic processing unit 101 through the transmission path 120. For example, these storage devices may be connected to any other external apparatus through the network 200 as part of cloud computing.

Further, the network interfaces in the server 100 and the terminal device 2 may be either of wireless LAN devices and wired LAN devices, and the network interfaces may be internally mounted, or may be of an external device type such as a LAN card. Further, a game machine connectable to the network 200 may be used as the terminal device 2.

As described above, the control apparatus, the control method, the computer-readable recording medium, and the game system disclosed herein can add or improve unexpectedness, dramatic impact, and taste when game items or the like as a reward are provided to a player, and this can lead to providing a social game capable of raising the player's motivation to participate in the game or continue the game. Therefore, it is possible to make wide and effective use of the invention disclosed herein for games in general (particularly including social game elements), which are delivered, provided, and performed particularly in a server-client type network structure, software and hardware related technologies in general, which are related to delivering, providing, and performing the games, and further activities of designing, manufacturing, and selling the games.

DESCRIPTION OF REFERENCE NUMERALS

1: game system
2: terminal device
21: client computer (terminal device)
22: mobile terminal (terminal device)
100: server
101: arithmetic processing unit (control unit)
102: ROM (information storage unit)
103: RAM (information storage unit)
104: external interface
105: input unit
106: external memory
107: image processing unit
108: slot drive
109: audio processing unit
110: network interface
111: display monitor
112: speaker device
120: transmission path
200: network (communication line)

What is claimed is:

1. A game control method, comprising:
storing, by a memory for storing information related to a game in which a plurality of players can participate, information defining a plurality of groups to which said players belong, and reward box information for a plurality of reward boxes provided within the game, as part of the information related to the game; and
by an arithmetic processor,
determining that at least one predetermined condition has occurred within the game, and, after the at least one predetermined condition is determined to have occurred, allocating at least one reward to at least one of the reward boxes provided within the game based on the at least one predetermined condition,
after allocating the at least one reward to the at least one of the reward boxes provided within the game based on the at least one predetermined condition, determining whether a reward providing condition is met by determining whether at least one player in the group associated with one of the reward boxes provided within the game has met the reward providing condition, and, after and as a result of determining that the at least one player in the group has met the reward providing condition, providing the reward allocated to the one of the reward boxes provided within the game to the at least one player in the group, and
causing a screen to be displayed in a communication terminal, said screen indicating that the reward allocated to the one of the reward boxes provided within the game has been provided to the at least one player in the group associated with the one of the reward boxes provided within the game.

2. The game control method of claim 1, wherein the at least one predetermined condition is selected from: an elapsed time of the game; a number of enemy characters defeated by at least one of the players in the plurality of players; a progress of the game, the progress of the game comprising a number of completions within the game; an attribute of a predetermined event within the game; a type of the at least one of the reward boxes provided within the game; a state of a player character of the at least one of the players in the plurality of players; a number of items possessed by the player character; and an ability of an item possessed by the player character.

3. The game control method of claim 1, wherein displaying the screen comprises displaying a plurality of treasure boxes, each of the treasure boxes in the plurality of treasure boxes associated with a group in the plurality of groups.

4. The game control method of claim 3, wherein displaying the screen further comprises displaying, in a communication terminal of the at least one player in the group, a reward box associated with the group to which the at least one player belongs, and at least one reward box associated with another group in the plurality of groups.

5. The game control method of claim 1, further comprising:
after displaying the screen indicating that the reward allocated to the one of the reward boxes has been provided to the at least one player in the group, updating a display of the reward box on the screen based on the provided reward.

6. The game control method of claim 5, wherein updating the display of the reward box comprises associating an annotation with the reward box indicating that the reward box is currently empty.

7. A non-transitory computer-readable recording medium recording program for causing a computer to perform steps of:
storing, by a memory accessible to the computer for storing information related to a game in which a plurality of players can participate, information defining a plurality of groups to which said players belong, and reward box information for a plurality of reward boxes provided within the game, as part of the information related to the game; and
by an arithmetic processor of the computer:
determining that at least one predetermined condition has occurred within the game, and, after the at least one predetermined condition is determined to have occurred, allocating at least one reward to at least one of the reward boxes within the game based on the at least one predetermined condition,
after allocating the at least one reward to the at least one of the reward boxes provided within the game based on the at least one predetermined condition, determining whether a reward providing condition is met by determining whether at least one player in the group associated with one of the reward boxes provided within the game has met the reward providing condition, and, after and as a result of determining that the at least one player in the group has met the reward providing condition, providing the reward allocated to the one of the reward boxes within the game to the at least one player in the group, and
causing a screen to be displayed on a display of the computer, said screen indicating that the reward allocated to the one of the reward boxes provided within the game has been provided to the at least one player in the group associated with the one of the reward boxes provided within the game.

8. The non-transitory computer-readable recording medium of claim 7, wherein the at least one predetermined condition is selected from: an elapsed time of the game; a number of enemy characters defeated by at least one of the players in the plurality of players; a progress of the game, the progress of the game comprising a number of completions within the game; an attribute of a predetermined event within the game; a type of the at least one of the reward boxes provided within the game; a state of a player character of the at least one of the players in the plurality of players; a number of items possessed by the player character; and an ability of an item possessed by the player character.

9. The non-transitory computer-readable recording medium of claim 7, wherein displaying the screen comprises displaying a plurality of treasure boxes, each of the treasure boxes in the plurality of treasure boxes associated with a group in the plurality of groups.

10. The non-transitory computer-readable recording medium of claim 9, wherein displaying the screen further comprises displaying, in a communication terminal of the at least one player in the group, a reward box associated with the group to which the at least one player belongs, and at least one reward box associated with another group in the plurality of groups.

11. The non-transitory computer-readable recording medium of claim 7, further comprising:
after displaying the screen indicating that the reward allocated to the one of the reward boxes has been provided to the at least one player in the group, updating a display of the reward box on the screen based on the provided reward.

12. The non-transitory computer-readable recording medium of claim 11, wherein updating the display of the reward box comprises associating an annotation with the reward box indicating that the reward box is currently empty.

13. A game control apparatus comprising:
a memory for storing information related to a game in which a plurality of players can participate; and
an arithmetic processor for accessing the information related to the game,
wherein the memory is configured to perform a step of storing information defining a plurality of groups to which said players belong, and reward box information for a plurality of reward boxes provided within the game, as part of the information related to the game; and
wherein the arithmetic processor is configured to perform steps of:
determining that at least one predetermined condition has occurred within the game, and, after the at least one predetermined condition is determined to have occurred, allocating at least one reward to at least one of the reward boxes provided within the game based on the at least one predetermined condition,
after allocating the at least one reward to the at least one of the reward boxes provided within the game based on the at least one predetermined condition, determining whether a reward providing condition is met by determining whether at least one player in the group associated with one of the reward boxes provided within the game has met the reward providing condition, and, after and as a result of determining that the at least one player in the group has met the reward providing condition, providing the reward allocated to the one of the reward boxes provided within the game to the at least one player in the group, and
causing a screen to be displayed in a communication terminal, said screen indicating that the reward allocated to the one of the reward boxes provided within the game has been provided to the at least one player in the group associated with the one of the reward boxes provided within the game.

14. The game control apparatus according to claim 13, wherein the at least one predetermined condition is selected from: an elapsed time of the game; a number of enemy characters defeated by at least one of the players in the plurality of players; a progress of the game, the progress of the game comprising a number of completions within the game; an attribute of a predetermined event within the game; a type of the at least one of the reward boxes provided within the game; a state of a player character of the at least one of the players in the plurality of players; a number of items possessed by the player character; and an ability of an item possessed by the player character.

15. The game control apparatus according to claim 13, wherein displaying the screen comprises displaying a plurality of treasure boxes, each of the treasure boxes in the plurality of treasure boxes associated with a group in the plurality of groups.

16. The game control apparatus according to claim 15, wherein displaying the screen further comprises displaying, in the communication terminal, to the at least one player in the group, a reward box associated with the group to which the at least one player belongs, and at least one reward box associated with another group in the plurality of groups.

17. The game control apparatus according to claim 13, wherein the arithmetic processor is further configured to perform a step of:
after displaying the screen indicating that the reward allocated to the one of the reward boxes has been provided to the at least one player in the group, updating a display of the reward box on the screen based on the provided reward.

18. The game control apparatus according to claim 17, wherein updating the display of the reward box comprises associating an annotation with the reward box indicating that the reward box is currently empty.

* * * * *